Patented Nov. 19, 1929

1,736,047

UNITED STATES PATENT OFFICE

CLARENCE A. NASH, OF MILWAUKEE, WISCONSIN, AND JOHN P. TRICKEY, OF EVANSTON, AND CARL S. MINER, OF GLENCOE, ILLINOIS, ASSIGNORS, BY DIRECT AND MESNE ASSIGNMENTS, TO THE QUAKER OATS COMPANY, OF CHICAGO, ILLINOIS, A CORPORATION OF NEW JERSEY

SYNTHETIC MATERIAL ADAPTED TO THE PLASTIC ART

No Drawing.   Application filed January 13, 1923. Serial No. 612,552.

This invention relates to synthetic materials adapted to the plastic art and to methods of production and treatment of such materials.

Although not limited thereto, the invention relates especially to materials adapted to or resulting from treatment which may include form giving treatment at ordinary temperatures with subsequent ultimate hardening by treatment which may include prolonged heat cure.

Heretofore it has been proposed to produce plastic material as a result of partial condensation reaction of a phenolic body and methylene substance and to effect subsequent hardening of such product through completion of the condensation reaction, a suitable hardening agent such as formaldehyde or hexamethylenetetramine being employed, which agent may be present during formation of a plastic material or may be subsequently added thereto.

Such products have heretofore been applied to numerous exceedingly important uses; the treatment employed to adapt the material to many such uses including forming while plastic, and hardening. In certain cases the forming and hardening are effected concurrently or substantially so, whereas in other cases such actions are effected sequentially.

However, in the formation and subsequent treatment of such plastic materials, particularly where the actual or contemplated forming treatment is effected at ordinary temperature and the hardening is effected subsequently and as a distinct operation, great difficulty has been experienced in securing adequate plasticity and other desirable characteristics of the product, whereby the use of solvent substances and other undesirable expedients is often found necessary to enable satisfactory forming.

Thus in practice it has been found that where the initial or partial condensation reaction takes place in the presence of the final hardening agent it is exceedingly difficult to effect arrest of the reaction prior to inception and some degree of progress of hardening action whereby the plasticity of the product is destroyed or seriously reduced. On the other hand where the initial reaction is rendered self arresting through absence of the hardening agent, subsequent addition of such agent is required, whereas the chemical and physical properties of the hardening agents so added have been such as to reduce rather than augment plasticity of the product.

Also numerous unsuccessful attempts have heretofore been made to produce a material, adapted to hot molding and concurrent hardening, comprising a reaction product of phenol, or a homologue thereof, with furfural. For such reaction it is ordinarily found necessary to employ catalytic activation for production of a product which is hard or capable of hardening whereas the acid catalysts ordinarily heretofore employed or attempted to be employed for the purpose have rendered the reaction uncontrollable in that the product cannot be maintaned plastic for the period necessary to enable form giving treatment by ordinary known methods. On the other hand the alkaline catalysts employed or proposed have proven inadequate to effect hardening of the product within the time during which the material may, with commercial economy, be permitted to remain in the mold in accordance with the known methods of hot molding.

Thus so far as applicants are aware such attempts to produce from reaction products of phenolic bodies and furfural or its equivalent a product adapted to hot molding have heretofore failed in all cases except those wherein there has been present sufficient organic hardening agent, such as hexamethylenetetramine, to characterize and identify the reaction as the well known phenol methylene condensation action.

We have discovered, however, that a reaction product of a phenolic body and a substance capable of furnishing the fural group, activated by the presence of an alkaline catalyst, by reason of the aforementioned slow rate of reaction which renders the same wholly unadapted to ordinary hot molding, may nevertheless with peculiar advantage be adapted to form giving treatment at ordinary temperature with subsequent ultimate hardening, after removal from the mold, through prolonged and preferably progressive heat treatment. Such slow rate of reaction has furthermore been found in practice extremely beneficial not only for enabling enactment of the form giving treatment but also in eliminating or minimizing distortion, cracking, blistering and other deterioration of the formed pieces such as is likely to occur during heat cure of materials which tend to undergo ultimate hardening with undue rapidity and before escape of entrapped volatile substances, solvents, decomposition products or the like which are ordinarily evolved during the earlier stages of the cure.

Thus an object of the present invention is that of providing improved plastic material adapted to uses, among other uses, to which the aforementioned phenolic condensation products have heretofore been applied and wherein the aforementioned disadvantageous features of such products are obviated.

Another object is that of providing advantageous and improved methods of producing such improved material, wherein the aforeencountered difficulties and disadvantages are overcome or minimized.

Another object is that of providing improved final and intermediate products comprising such material.

Another object is that of providing improved methods of treating such material to produce such products.

Another and more specific object of the invention is that of providing for production of an improved plastic material from agents or ingredients including an ultimate hardening agent which is adapted, by reason of its solvent action upon the reaction agents and ingredients and also upon the product undergoing formation, to function as a reaction medium for enabling ready and accurate control of the reaction for arrest thereof at a desired or predetermined stage.

Another object is that of providing for production of an improved plastic material from agents or ingredients including an ultimate hardening agent which is itself capable by polymerization or otherwise through catalytic action and without permanent chemical combination with any other reagent, of transformation in situ into a resin, any excess of the unreacted hardening agent being capable, moreover, of removal from the product through volatilization.

Another object is that of providing for production of plastic material, particularly adapted to form giving treatment at ordinary temperature, to include an ultimate hardening agent which by its solvent action serves to augment and maintain plasticity of the product.

Another object of the invention is that of providing commercially and industrially useful products as aforecharacterized employing as the ultimate hardening agent furfural or its equivalent.

Other objects and advantages will hereinafter appear.

In the production of the herein contemplated product it is proposed to bring together for the initial or primary reaction a phenolic body and a substance capable of furnishing the fural group, for production of a partial or initial condensation product wherein considerably less than the total combining quantity of the latter substance is combined with phenolic substance, the extent to which the reaction is caused or permitted to progress being determined by the contemplated or intended use of such initial product and the degree of plasticity and the like required for such use.

The quantity of the fural furnishing substance present during formation of the incomplete condensation product, or such quantity increased by subsequent addition of fural furnishing substance, is preferably sufficient to afford a substantial excess of fural groups over phenolic groups in the molding compound.

The substance preferably employed is furfural, or a derivative thereof, and the same is preferably employed both as the condensing agent for the phenolic body and as the ultimate hardening agent for the incomplete condensation product, furfural having been found to exhibit very marked solvent properties toward the reaction ingredients and toward the initial condensation product both during and subsequent to production thereof, and since furfural is capable by polymerization or otherwise, through catalytic action and without permanent chemical combination with any other reagent, of transformation in situ into a resin, whereas any excess of unreacted furfural may be removed from the product through volatilization.

While phenol and furfural may be caused to react under either acid or alkaline activation, or even in the absence of extraneous chemical activation, nevertheless as aforestated the use of ordinary acid catalytic agents tends to cause the product to harden with such rapidity as to inadapt the same to any of the usual form giving treatments. Therefore it is proposed and preferred herein to employ both for production and for ultimate hardening of the plastic product an alkaline activating agent, preferably non-ammoniacal in character, although, as aforestated, it is possible and is in certain cases desirable or preferable to produce and also to harden the product in the absence of chemical activation.

The herein contemplated incomplete condensation product, while capable of various uses, is particularly adapted to use as a binder for incorporation with and impregnation of a suitable filler in the production of plastic material which is well adapted to form giving treatment at ordinary temperature followed by heat hardening or cure.

As typical of the procedure which may be adopted in producing such incomplete condensation product by the methods herein contemplated; ninty-four parts of phenol and approximately one hundred four parts of furfural are brought together in the presence of a catalytic agent which may comprise a quantity of sodium carbonate substantially equal to one percent by weight of the reaction mixture.

Since the foregoing ingredients do not react readily at ordinary temperatures, it is ordinarily necessary to stimulate reaction thereof, as by application of heat. The lowest temperature at which the reaction occurs at a sensible rate has been found to be somewhat lower than the boiling temperature of the mixture of phenol and furfural as indicated by the respective boiling points of said ingredients and the proportions in which the same are present in the mixture.

In practice the rate of progress of the reaction may be controlled with great facility and certainty through temperature control of the reacting bodies, the reaction being distinctly endo-thermic and being readily arrested by simple discontinuance of the external heat supply, except in cases where the temperature has been raised considerably above the minimum reaction temperature, in which case cessation of the reaction may involve a brief time element during which the temperature is caused or permitted to subside below the minimum reaction temperature.

Moreover, the reaction when so arrested may be reinitiated at any time by simply reheating the partially reacted product to its reaction temperature, thus enabling temporary suspension of the reaction for subjecting the product to tests calculated to determine its fitness for a particular use, with subsequent continuance of the reaction when necessary or desired.

When the reaction has proceeded to the proper stage, as determined by such tests or otherwise, the reaction is arrested by termination or suitable reduction of the external heat supply, the resultant product being then adapted or adaptable to numerous uses including that as a binder ingredient of a molding compound.

For production of such compound, approximately 19 parts of the binder constituted as described is maintained at or brought to a temperature preferably somewhat below that at which reaction proceeds, and 50 parts of comminuted asbestos or other suitable filler is added thereto and thoroughly incorporated therein and impregnated thereby. Such incorporation and impregnation may be facilitated by addition of a quantity of a suitable solvent substance which may comprise additional furfural. When adding the furfural solvent at this time, it is desirable to add a sufficient quantity of the furfural to act not only as an aid for the incorporation and impregnation of the filler but also to bring the quantity of the furfural in the finished article to an excess over equi-molecular proportions with respect to the phenolic body. Where such a solvent substance is employed, the same may be either mixed with the filler prior to impregnaiton or may be added to the binder.

After such incorporation and impregation of the binder and filler materials the resultant mix is preferably disintegrated, screened to approximately 10 to 20 or other desired mesh and is thereafter subjected to the form giving treatment.

Such treatment is preferably carried out by means of a hydraulic or other press at ordinary or atmospheric temperature, although in certain special cases it may be found advantageous to warm or otherwise vary the temperature of the molding compound.

The pressures employed may vary between relatively wide limits as from five to twenty tons per square inch dependent upon the size and shape of the piece, the consistency of the molding compound and other factors, whereas in certain special cases even higher pressures may be advantageously employed. Also lubrication may be resorted to if desired.

Following pressing the formed shapes or pieces are preferably ejected or otherwise removed from the mold, being of such firmness and strength as to enable such removal and also to enable subsequent handling without damage and being inherently adapted to ultimate hardening.

The pieces are thereafter subjected to prolonged heat treatment or cure which may be carried out at atmospheric pressure or in certain cases artificial pressure conditions may be imposed.

The heat cure may be initiated at approximately 175 degrees F. and may extend over a period of from one hour, or less, to twenty hours or even more, during which the temperature may be increased gradually or periodically to a maximum of 450 degrees F. or higher. Also, particularly where the duration of the cure is short, the initial temperature may considerably exceed the value aforestated.

Following the aforedescribed cure, the pieces are characterized by great hardness with resistivity toward the ordinary solvents and chemical agents, and are moreover possessed of a high natural finish.

It is observed that the aforedescribed method is in no wise dependent upon the use of methylene substance either as the ultimate harding agent or for any purpose but on the other hand the ultimate hardening agent actually employed is adapted to exert marked solvent action upon the incomplete condensation product. Also where the same agent is employed in the initial or incomplete condensation reaction such agent is adapted similarly to exert solvent and diluent action upon the resultant product as formed and upon the ingredients thereof whereas by the use of such agent the initial reaction is rendered amenable to ready and accurate control which may include arrest and reinitiation at any subsequent time. Further the presence of the hardening agent in approximately the proportion mentioned serves to maintain the plasticity of the product substantially unimpaired over relatively long periods during which the material may be transported, stored or otherwise handled.

Again furfural itself is, as aforestated capable of transformation through catalytic action and temperature control into a resin and is moreover thermo-volatile in character whereby any excess of furfural above the quantity required for combination with the other constituents or constituent of the product may under imposed conditions be either fixed in situ through resinification or expelled by volatilization.

Also it is to be observed that no acid or ammoniacal catalytic agent is required either for starting or for promoting chemical reaction.

It may be observed further that, in the example stated, the proportions of the substances employed are such as to afford for the product substantially 6½ fural groups to each 6 phenolic groups, and while these proportions have been found to produce a product well adapted to the uses herein contemplated, it is to be understood that such proportions are capable of considerable variation without material or serious alteration of the character of the product formed, for it will be recognized that since the use of an excess of the solvent furfural is contemplated such excess may be varied within wide limits to provide a wide range of technical products.

Again while the foregoing specific example mentions only phenol and furfural as the main reagents it is to be understood that equivalent substances, such as cresol or other phenolic body on the one hand and on the other hand derivatives of furfural capable of furnishing a fural substance under the conditions imposed, and without material alteration of such conditions are included in the present teaching, whereas equivalent catalytic agents may be substituted for the sodium carbonate mentioned.

It is also to be understood that the filler material employed may be incorporated or introduced at practically any desired stage of the incomplete condensation reaction or even prior to inception of the reaction.

It is to be noted that throughout we have employed the terms "fural furnishing substance" and "fural yielding substance", but it is to be understood that these expressions are synonymous and pertain to the same substances or materials.

What we claim as new and desire to secure by Letters Patent is:

1. The process of producing synthetic plastic material adapted to ultimate hardening, which comprises effecting partial condensation reaction of a phenolic body and a fural yielding substance, controlling the condensation reaction so that it may be positively arrested at any intermediate stage, and adding additional fural yielding substance to bring it in excess of equimolecular proportions with respect to said phenolic body.

2. The process of producing synthetic plastic material adapted to ultimate hardening through action involving only its own constituents, which comprises heating together for reaction, in the presence of a non-ammoniacal alkaline catalyst, a phenolic body and a fural yielding substance that produces fural in a quantity greater than equimolecular proportions.

3. The process of producing synthetic plastic material adapted to ultimate hardening through action involving only its own constituents, which comprises heating together for reaction, in the presence of a non-ammoniacal alkaline catalyst, a phenolic body and a fural yielding substance in a proportion affording a quantity of fural in excess of equimolecular proportions relative to the quantity of the phenolic body present, maintaining the temperature of the reacting bodies near the point at which the mixture thereof is adapted to boil, and lowering the temperature of such mixture for arrest of the reaction at an intermediate stage to produce a resin adapted to ultimate hardening.

4. The process for producing a hard and substantially infusible and insoluble condensation product, which comprises bringing into intimate contact for reaction under conditions of activation, a phenolic body and a fural yielding substance in excess of equimolecular proportions, maintaining such contact until reaction ensues, arresting such reaction at an intermediate stage thereby adapting the product to form giving treatment, and then transforming said intermediate product into a hard and substantially infusible and insoluble product.

5. The process which comprises bringing into intimate contact for reaction under conditions of activation, a phenolic body and a fural yielding substance in excess of equimolecular proportions adequate for the production of a hard and substantially infusible and insoluble condensation product, maintaining such contact until reaction ensues, and modifying the conditions of activation to effect arrest of the reaction at an intermediate stage thereby adapting the product to form giving treatment.

6. The process of condensation of a phenolic body which comprises reacting thereon with a fural yielding substance in excess of equimolecular proportions in the presence of a non-ammoniacal alkaline catalytic agent.

7. The process which comprises reacting upon a phenolic body with an excess of fural yielding substance, arresting the reaction at an intermediate stage, subjecting the resultant product to form giving treatment, and hardening the formed product.

8. Plastic material adapted to ultimate hardening, comprising the product of incomplete condensation reaction of a phenolic body with an excess of a substance which exhibits marked solvent properties with respect to the partial condensation product and also acts as an ultimate hardening agent therefor.

9. Plastic material adapted to ultimate hardening, comprising the product of incomplete condensation reaction of a phenolic body with an excess of a substance adapted to act as an ultimate hardening agent for the partial condensation product and which is itself capable of resinification without chemical combination with any other reagent.

10. Plastic material adapted to ultimate hardening, comprising the product of incomplete condensation reaction of a phenolic body with an excess of a substance which is itself capable both of volatilization and of resinification by catalytic action without chemical combination with any other reagent and which is adapted to act as an ultimate hardening agent for said partial condensation product.

11. Plastic material adapted to ultimate hardening, comprising the product of incomplete condensation reaction of a phenolic body with an excess of a substance which is itself capable both of volatilization and of resinification by catalytic action without chemical combination with any other reagent and which is adapted to exhibit marked solvent properties with respect to said partial condensation product and to act as an ultimate hardening agent therefor.

12. Plastic material adapted to ultimate heat hardening, comprising an incomplete reaction product of a phenolic body with a fural yielding substance wherein free phenol and free fural yielding substance coexists simultaneously, the quantity of the total fural yielding substance being in excess of equimolecular proportions with respect to said phenolic body, to act as a hardening agent for said plastic material.

13. Plastic material adapted to ultimate heat hardening comprising the product of incomplete condensation of a phenolic body with an excess over equimolecular proportions of a fural yielding substance in the presence of a non-ammoniacal alkaline catalytic agent.

14. Plastic material adapted to ultimate heat hardening, comprising the product of incomplete condensation in the presence of a non-ammoniacal alkaline catalytic agent, of a phenolic body with fural yielding substance in proportions affording a quantity of the fural substance in excess of equimolecular proportions over the quantity of the phenolic body present, and having a substantial percentage of the phenolic body uncombined with the fural substance.

15. The process which comprises bringing into intimate contact for reaction under conditions of activation fural yielding and phenolic bodies in proportions whereby the fural yielding body is in excess over equimolecular proportions with respect to the phenolic body, maintaining such contact until reaction ensues, and modifying the conditions of activation to effect arrest of the reaction at an intermediate stage thereby adapting the product to form giving treatment under pressure.

16. The process which comprises bringing into intimate contact for reaction, under conditions of chemical and thermal activation, fural yielding and phenolic bodies in proportions whereby the fural yielding body is in excess over equimolecular proportions with respect to the phenolic body, maintaining such conditions throughout at least a part of the resultant reaction, and exercising temperature control to effect arrest of the reaction at a stage wherein the product is adapted to form giving treatment under pressure and to ultimate induration under further heat treatment.

17. A hard and substantially infusible and insoluble product of condensation of phenolic and fural yielding substances comprising a non-ammoniacal alkaline catalytic agent, said fural yielding substance being in excess over equimolecular proportions relative to said phenolic substance.

18. As an article of manufacture a hard and substantially infusible and insoluble formed piece which is the molded product of incomplete condensation reaction of substances including a phenolic body, hardened with furfural in excess over equimolecular proportions relative to said phenolic body and comprising sodium carbonate.

In witness whereof, I have hereunto subscribed my name.

CLARENCE A. NASH.

In witness whereof, I have hereunto subscribed my name.

JOHN F. TRICKEY.

In witness whereof, I have hereunto subscribed my name.

CARL S. MINER.